US012803159B2

(12) United States Patent
Ushijima et al.

(10) Patent No.: US 12,803,159 B2
(45) Date of Patent: Nov. 17, 2026

(54) MULTILAYER SUBSTRATE AND ANTENNA DEVICE USING SAME

(71) Applicant: Mitsubishi Electric Corporation, Tokyo (JP)

(72) Inventors: Yu Ushijima, Tokyo (JP); Yosuke Tsuzaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/254,417

(22) Filed: Jun. 30, 2025

(65) Prior Publication Data

US 2025/0329907 A1 Oct. 23, 2025

Related U.S. Application Data

(63) Continuation of application No. PCT/JP2023/004374, filed on Feb. 9, 2023.

(51) Int. Cl.
*H01Q 1/50* (2006.01)
*H01P 1/02* (2006.01)
(Continued)

(52) U.S. Cl.
CPC ............... *H01Q 1/50* (2013.01); *H01P 1/022* (2013.01); *H01P 3/121* (2013.01); *H01P 3/122* (2013.01); *H01P 5/107* (2013.01)

(58) Field of Classification Search
CPC ...... H01Q 1/2283; H01Q 1/3233; H01Q 1/50; H01Q 23/00; H01P 1/02;
(Continued)

(56) References Cited

U.S. PATENT DOCUMENTS

2022/0416394 A1 12/2022 Tainaka et al.
2024/0380089 A1* 11/2024 Takahashi ............... H01P 3/121

FOREIGN PATENT DOCUMENTS

JP 2021-139779 A 9/2021

OTHER PUBLICATIONS

International Search Report, issued in PCT/JP2023/004374, PCT/ISA/210, dated Apr. 25, 2023.

* cited by examiner

*Primary Examiner* — Robert Karacsony
(74) *Attorney, Agent, or Firm* — Birch, Stewart, Kolasch & Birch, LLP

(57) ABSTRACT

A multilayer substrate (11) includes: a first dielectric layer (41) having a first conductive layer (21) on one side and a second conductive layer (22) on another side; a second dielectric layer (42) having a third conductive layer (23) on one side and a fourth conductive layer (24) on another side, the third conductive layer (23) being located apart from the second conductive layer (22); one or a plurality of intermediate dielectric layers (43) provided between the second conductive layer (22) and the third conductive layer (23); and a waveguide (31) which is a conductive tubular member contacting with an inner peripheral surface of a through hole penetrating through specific parts of the intermediate dielectric layers (43) in a direction from the second conductive layer (22) to the third conductive layer (23), an inside of the tubular member being filled with a dielectric material made of a material different from the first dielectric layer (41), the second dielectric layer (42), and the intermediate dielectric layer (43). A cross-section of the waveguide (31) along a direction perpendicular to a direction of penetration through the intermediate dielectric layers (43) has a shape obtained (Continued)

by cutting out both corners on one diagonal line of a quadrangular shape.

12 Claims, 11 Drawing Sheets

(51) Int. Cl.
*H01P 3/12* (2006.01)
*H01P 5/107* (2006.01)

(58) Field of Classification Search
CPC .... H01P 1/022–027; H01P 3/12; H01P 3/121; H01P 3/122; H01P 5/08; H01P 5/082; H01P 5/085; H01P 5/087; H01P 5/10; H01P 5/1007; H01P 5/1015; H01P 5/1022; H01P 5/103; H01P 5/107
See application file for complete search history.

MULTILAYER SUBSTRATE AND ANTENNA DEVICE USING SAME

CROSS REFERENCE TO RELATED APPLICATION

This application is a Continuation of PCT International Application No. PCT/JP2023/004374, filed on Feb. 9, 2023, which is hereby expressly incorporated by reference into the present application.

TECHNICAL FIELD

The present disclosure relates to a multilayer substrate and an antenna device using the same.

BACKGROUND ART

An antenna device is a device that transmits a high-frequency signal in a microwave band or a millimeter-wave band. The antenna device includes an antenna, an IC (Integrated Circuit) which is a high-frequency signal generator for generating a high-frequency signal, and a power feed line. The power feed line connects the antenna and the IC. The IC may be mounted to a substrate surface of a dielectric substrate different from its substrate surface at which the antenna and the power feed line are formed.

In the case of mounting the IC at the substrate surface of the dielectric substrate different from its substrate surface at which the antenna is formed, a circuit (converter) for connecting both surfaces is needed. A configuration in which a waveguide filled with a dielectric material is formed in an inner layer of a multilayer substrate which is a dielectric substrate is disclosed (see, for example, Patent Document 1). In Patent Document 1, a converter has the multilayer substrate, the waveguide formed in the inner layer of the multilayer substrate and filled with the dielectric material, and a microstrip line, and a signal propagates from the waveguide to the microstrip line. Using the disclosed converter, a front surface and a back surface of the multilayer substrate can be connected.

CITATION LIST

Patent Document

Patent Document 1: Japanese Laid-Open Patent Publication No. 2021-139779

SUMMARY OF THE INVENTION

Problem to Be Solved by the Invention

Using the waveguide formed in the inner layer of the multilayer substrate and filled with the dielectric material, the front surface and the back surface of the multilayer substrate can be connected. However, in the case of connecting the front surface and the back surface of the multilayer substrate by the disclosed waveguide shape, the direction of a signal to propagate is limited to one specific direction. For example, a signal having propagated through a microstrip line provided at the front surface and extending in an X direction which is one specific direction passes through the waveguide and propagates through only a microstrip line provided at the back surface and extending in the X direction. Therefore, in a case of desiring to turn the propagation direction of the signal by 90 degrees, i.e., perpendicularly, between the front surface and the back surface, an additional power feed line for changing the propagation direction of the signal is needed at one of the front surface or the back surface.

Regarding the additional power feed line, for example, in a case where a space in which the power feed line can be routed cannot be ensured sufficiently, the propagation direction of the signal needs to be sharply changed. The power feed line on which the propagation direction of the signal is sharply changed has a discontinuous part. At the discontinuous part, unnecessary radio waves are radiated (hereinafter, referred to as unnecessary radiation). The unnecessary radiation influences antenna performance and circuit performance, depending on the amount of the unnecessary radiation. Thus, there is a problem that unnecessary radiation occurs from the discontinuous part. In order to reduce the amount of unnecessary radiation, the line direction of the additional power feed line may be mildly turned. However, in the case of mildly turning the direction of the additional power feed line, the space for routing the power feed line increases, so that the area of the circuit at which the power feed line is provided increases, thus causing a problem of increasing the size of the multilayer substrate. In addition, since the area of the circuit increases, there is a problem that the degree of freedom in designing of the multilayer substrate is reduced.

Accordingly, an object of the present disclosure is to provide a multilayer substrate that is reduced in the amount of unnecessary radiation, reduced in size, and improved in the degree of freedom in designing, and an antenna device using the multiplayer substrate.

Means to Solve the Problem

A multilayer substrate according to the present disclosure includes: a first dielectric layer having a first conductive layer on one side and a second conductive layer on another side opposite to the one side; a second dielectric layer having a third conductive layer on one side and a fourth conductive layer on another side opposite to the one side, the third conductive layer being located apart from the second conductive layer; one or a plurality of intermediate dielectric layers provided between the second conductive layer and the third conductive layer; and a waveguide which is a conductive tubular member contacting with an inner peripheral surface of a through hole penetrating through specific parts of the intermediate dielectric layers in a direction from the second conductive layer to the third conductive layer, an inside of the tubular member being filled with a dielectric material made of a material different from the first dielectric layer, the second dielectric layer, and the intermediate dielectric layer. In a case where the plurality of the intermediate dielectric layers are provided, an intermediate conductive layer is provided at each part between the plurality of intermediate dielectric layers. A cross-section of the waveguide along a direction perpendicular to a direction of penetration through the intermediate dielectric layers has a shape obtained by cutting out both corners on one diagonal line of a quadrangular shape.

An antenna device according to the present disclosure includes: the multilayer substrate according to the present disclosure; and an antenna connected to the first conductive layer or the fourth conductive layer.

Effect of the Invention

The multilayer substrate according to the present disclosure includes: the first dielectric layer having the first conductive layer on one side and the second conductive layer on another side opposite to the one side; the second dielectric layer having the third conductive layer on one side and the fourth conductive layer on another side opposite to the one side, the third conductive layer being located apart from the second conductive layer; one or a plurality of intermediate dielectric layers provided between the second conductive layer and the third conductive layer; and the waveguide which is the conductive tubular member contacting with the inner peripheral surface of the through hole penetrating through the specific parts of the intermediate dielectric layers, the inside of the tubular member being filled with the dielectric material made of the material different from the first dielectric layer, the second dielectric layer, and the intermediate dielectric layer. The cross-section of the waveguide along the direction perpendicular to the direction of penetration through the intermediate dielectric layers has the shape obtained by cutting out both corners on one diagonal line of the quadrangular shape. Thus, the direction of propagation of a signal inside the multilayer substrate can be changed by 90 degrees, and therefore an additional conductive pattern for changing the propagation direction of a signal is not needed in one of the first conductive layer or the fourth conductive layer. Since an additional conductive pattern is not needed, the size of the multilayer substrate can be reduced. In addition, since an additional conductive pattern is not needed and the area of a circuit does not increase, the degree of freedom in designing of the multilayer substrate can be improved. In addition, since there is no discontinuous part where the propagation direction of a signal is sharply changed, the amount of unnecessary radiation in the multilayer substrate can be reduced.

The antenna device according to the present disclosure includes: the multilayer substrate according to the present disclosure; and the antenna connected to the first conductive layer or the fourth conductive layer. Thus, by using the multilayer substrate according to the present disclosure for the antenna device, it is possible to provide the antenna device that is reduced in the amount of unnecessary radiation, reduced in size, and improved in the degree of freedom in designing.

DESCRIPTION OF EMBODIMENTS

Figure 1:
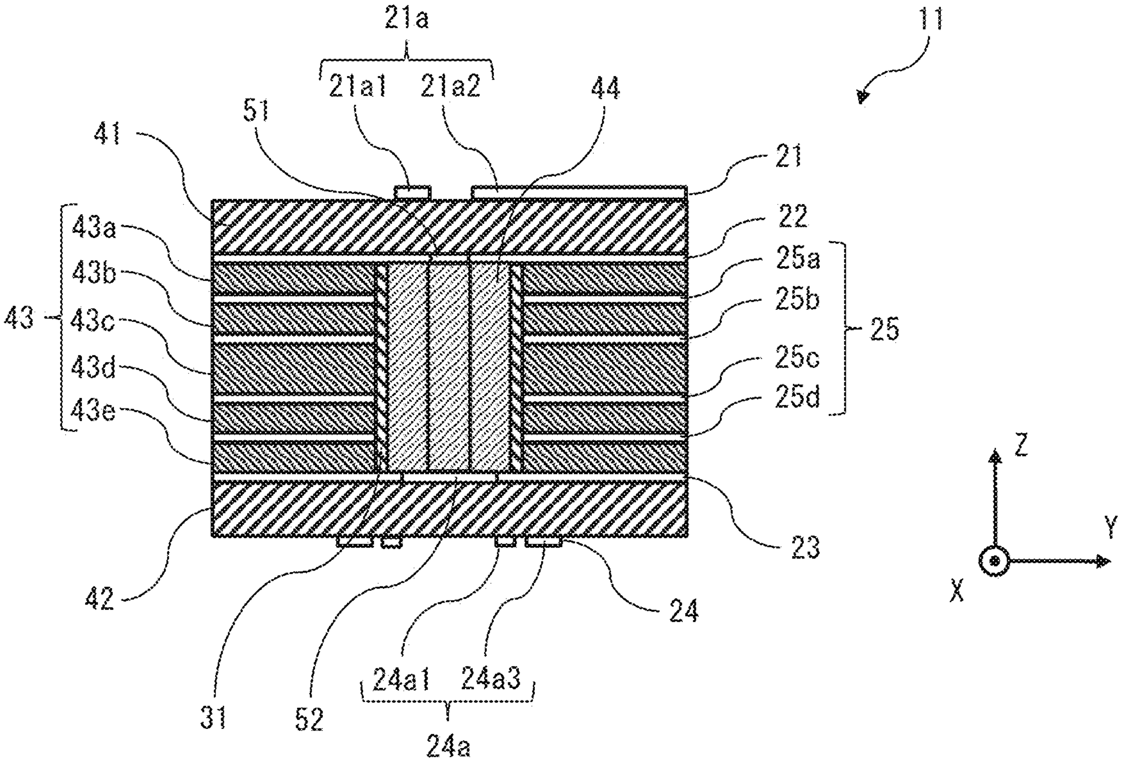
FIG. 1 is a sectional view schematically showing a multilayer substrate according to embodiment 1.

Hereinafter, a multilayer substrate and an antenna device using the same, according to embodiments of the present disclosure, will be described. In the drawings, the same or corresponding members and parts are denoted by the same reference characters, to give description.

Embodiment 1

Figure 2:
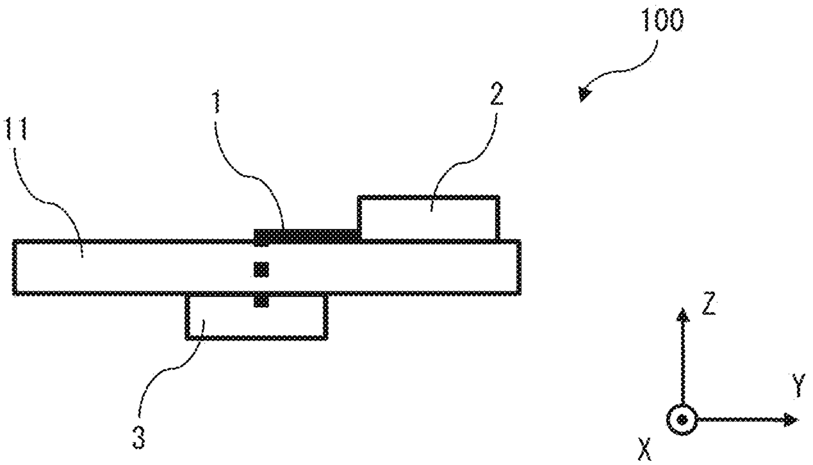
FIG. 2 is a schematic view schematically showing an antenna device using the multilayer substrate according to embodiment 1.
Figure 3:
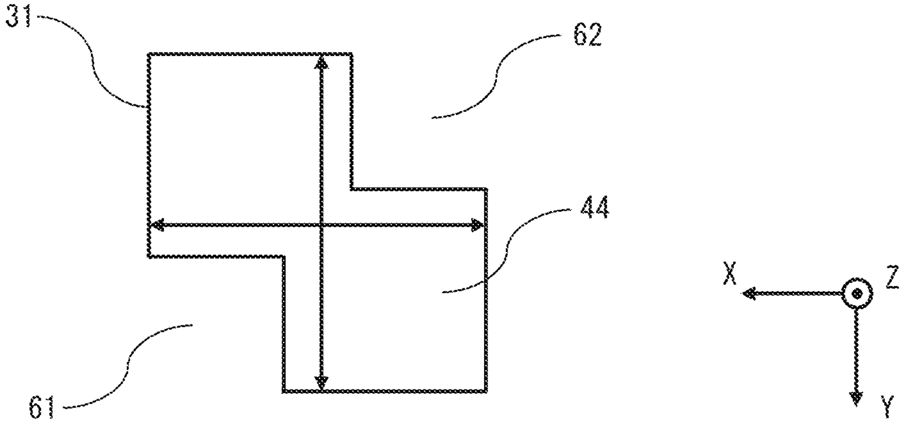
FIG. 3 is a sectional view schematically showing a waveguide of the multilayer substrate according to embodiment 1.
Figure 4:
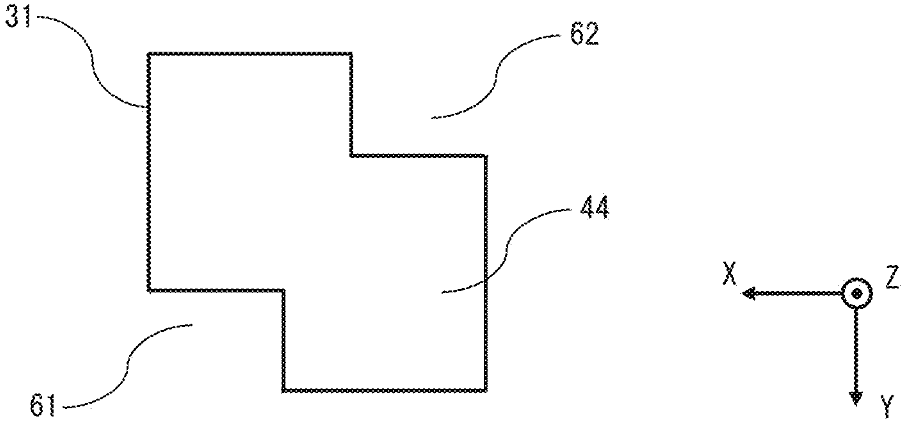
FIG. 4 is a sectional view schematically showing another waveguide of the multilayer substrate according to embodiment 1.
Figure 5:
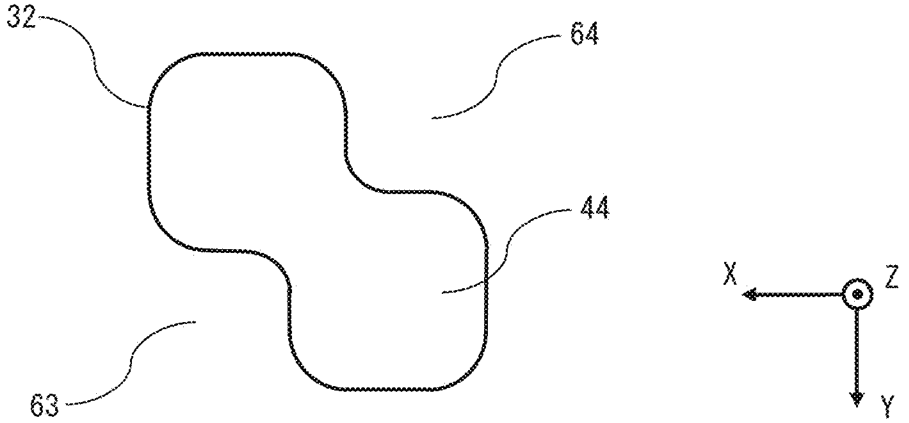
FIG. 5 is a sectional view schematically showing another waveguide of the multilayer substrate according to embodiment 1.
Figure 6:
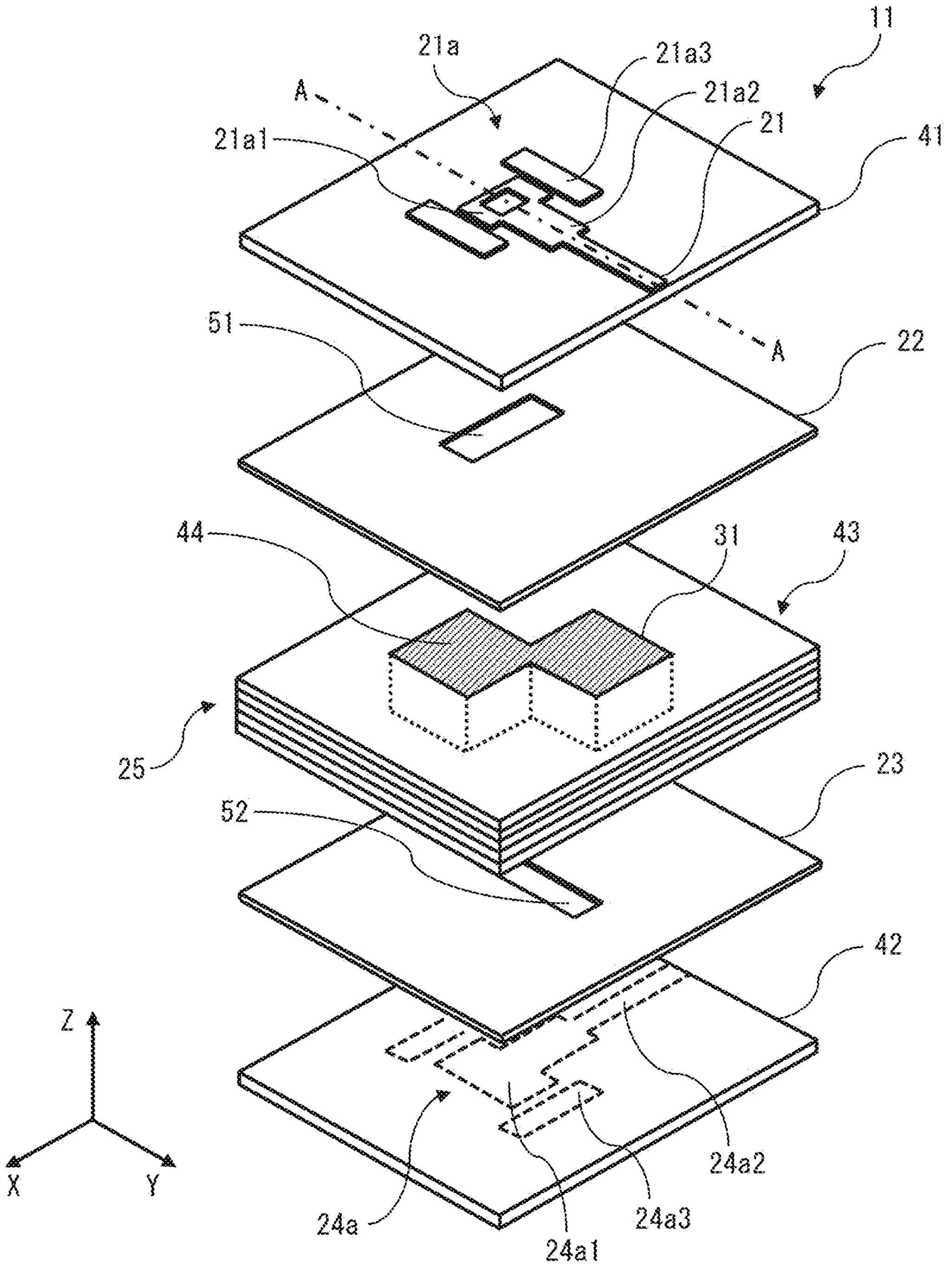
FIG. 6 is an exploded perspective view schematically showing the multilayer substrate according to embodiment 1.
Figure 7A:
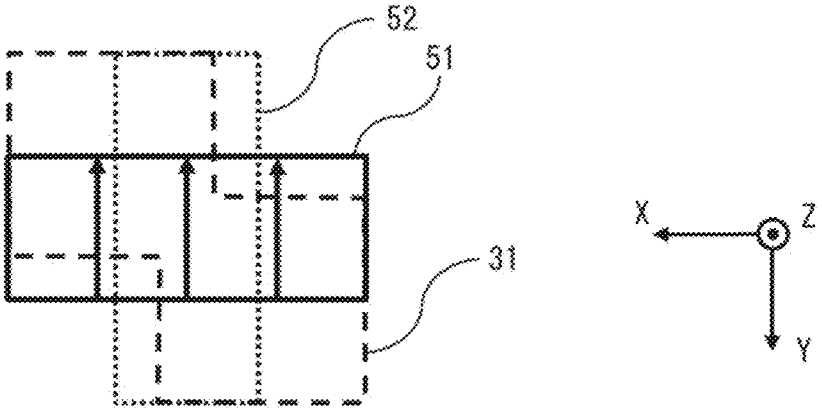
FIG. 7A illustrates operation of the waveguide of the multilayer substrate according to embodiment 1.
Figure 7B:
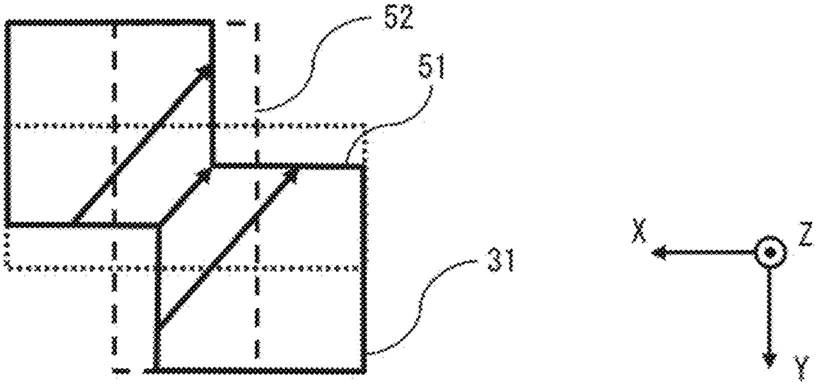
FIG. 7B illustrates operation of the waveguide of the multilayer substrate according to embodiment 1.
Figure 7C:
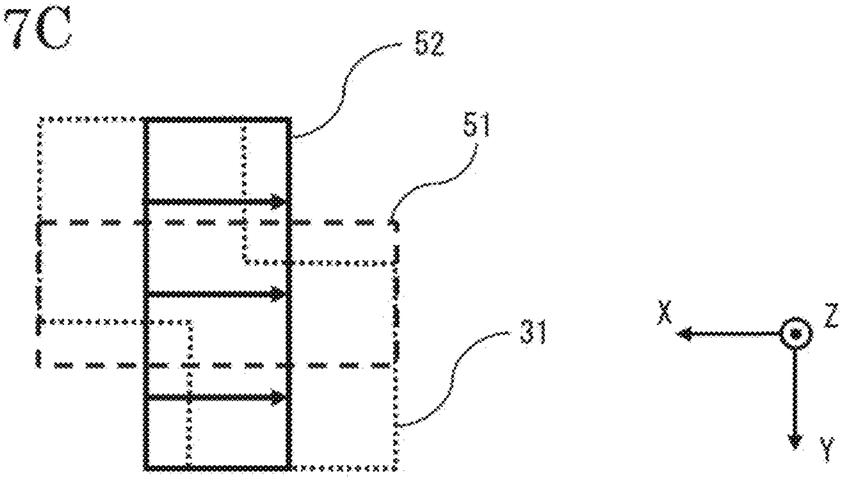
FIG. 7C illustrates operation of the waveguide of the multilayer substrate according to embodiment 1.
Figure 8:
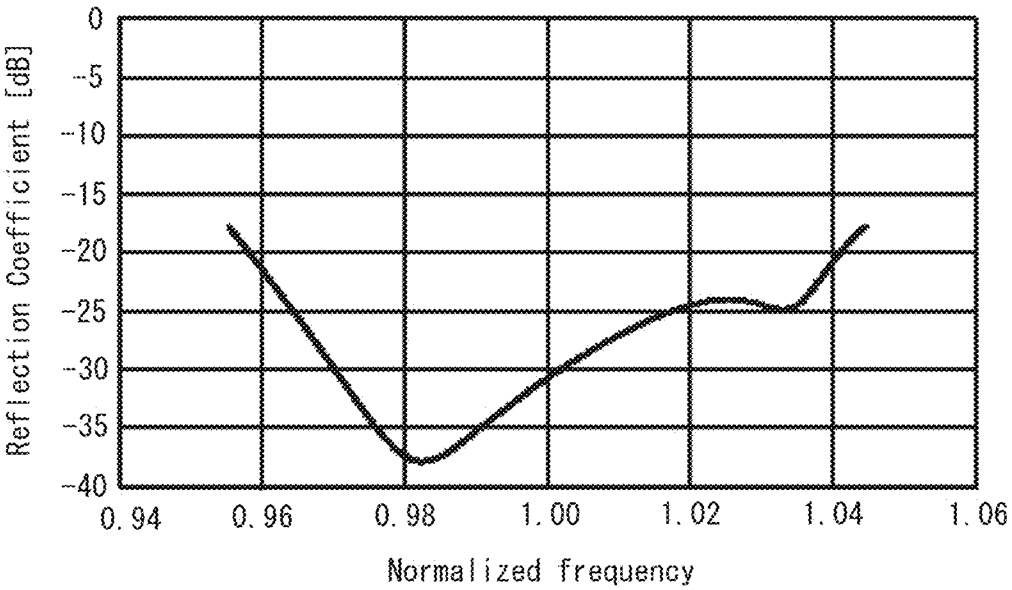
FIG. 8 shows a transmission line characteristic of the waveguide of the multilayer substrate according to embodiment 1.

FIG. 1 is a sectional view schematically showing a multilayer substrate 11 according to embodiment 1 when the multilayer substrate 11 is cut at an A-A cross-section position in FIG. 6. FIG. 2 is a schematic view schematically showing an antenna device 100 using the multilayer substrate 11 according to embodiment 1. FIG. 3 is a sectional view schematically showing a waveguide 31 of the multilayer substrate 11, and shows the shape of the cross-section along a direction perpendicular to the direction in which the waveguide 31 penetrates. FIG. 4 is a sectional view schematically showing another waveguide 31 of the multilayer substrate 11, and shows the shape of the cross-section along the direction perpendicular to the direction in which the waveguide 31 penetrates. FIG. 5 is a sectional view schematically showing another waveguide 32 of the multilayer substrate 11, and shows the shape of the cross-section along the direction perpendicular to the direction in which the waveguide 32 penetrates. FIG. 6 is an exploded perspective view schematically showing the multilayer substrate 11. FIG. 7A illustrates operation of the waveguide 31 of the multilayer substrate 11. FIG. 7B illustrates operation of the waveguide 31 of the multilayer substrate 11. FIG. 7C illustrates operation of the waveguide 31 of the multilayer substrate 11. FIG. 8 shows a transmission line characteristic of the waveguide 31 of the multilayer substrate 11, and shows a result of electromagnetic field analysis of a reflection coefficient. An X axis, a Y axis, and a Z axis shown in the drawings are defined as three axes perpendicular to each other. A direction parallel to the Y axis is defined as a Y-axis direction which is a first direction, a direction parallel to the X axis is defined as an X-axis direction which is a second direction, and a direction parallel to the Z axis is defined as a Z-axis direction which is a third direction. In the drawings, a direction indicated by an arrow in the X-axis direction is defined as a +X direction, and a direction opposite to the +X direction is defined as a −X direction. For the Y-axis direction and the Z-axis direction, the same definitions as in the case of the X-axis direction apply.

<Antenna Device 100>

As shown in FIG. 2, the antenna device 100 includes the multilayer substrate 11, a high-frequency signal generator 2, and an antenna 3. The multilayer substrate 11 includes a power feed line 1 through which a signal propagates from the high-frequency signal generator 2 to the antenna 3. The antenna device 100 using the power feed line 1 is a device that transmits a high-frequency signal in a microwave band or a millimeter-wave band. The microwave has a wavelength of 1 mm to 1 m and a frequency of 300 MHz to 300 GHz. The millimeter wave has a wavelength of 1 mm to 10 mm and a frequency of 30 GHz to 300 GHz. The antenna device 100 causes a signal to propagate from the first direction to the second direction.

The high-frequency signal generator 2 which generates a high-frequency signal is provided by an IC (Integrated Circuit), for example. The power feed line 1 connects the high-frequency signal generator 2 and the antenna 3. The high-frequency signal generator 2 is provided on the multilayer substrate 11, and the antenna 3 is connected to the multilayer substrate 11. The high-frequency signal generator 2 is mounted to a substrate surface of the multilayer substrate 11 different from its substrate surface to which the antenna 3 is connected. The antenna 3 is connected to a first conductive layer or a fourth conductive layer described later. The first conductive layer is provided at one substrate surface of the multilayer substrate 11, for example, and the fourth conductive layer is provided at another substrate surface of the multilayer substrate 11. In a case where the antenna 3 is connected to the first conductive layer, the high-frequency signal generator 2 is provided on the fourth conductive layer side. In a case where the antenna 3 is connected to the fourth conductive layer, the high-frequency signal generator 2 is provided on the first conductive layer side.

<Multilayer Substrate 11>

As shown in FIG. 1, the multilayer substrate 11 includes a first dielectric layer 41 having a first conductive layer 21 on one side and a second conductive layer 22 on another side opposite to the one side, a second dielectric layer 42 having a third conductive layer 23 on one side and a fourth conductive layer 24 on another side opposite to the one side, the third conductive layer 23 being located apart from the second conductive layer 22, one or a plurality of intermediate dielectric layers 43 provided between the second conductive layer 22 and the third conductive layer 23, and the waveguide 31. The number of the intermediate dielectric layers 43 may be either one or plural. In the present embodiment, the multilayer substrate 11 includes five intermediate dielectric layers 43, i.e., intermediate dielectric layers 43*a*, 43*b*, 43*c*, 43*d*, 43*e*. In the case where the multilayer substrate 11 includes a plurality of intermediate dielectric layers 43, an intermediate conductive layer 25 is provided at each part between the plurality of intermediate dielectric layers 43. In the present embodiment, since the multilayer substrate 11 includes five intermediate dielectric layers 43, four intermediate conductive layers 25*a*, 25*b*, 25*c*, 25*d* are provided. Each of the conductive layers included in the multilayer substrate 11 is a copper foil, for example. In FIG. 1, the first dielectric layer 41, the second dielectric layer 42, and the intermediate dielectric layers 43 are laminated in the Z direction, and the surfaces of the laminated layers having plate shapes are parallel to the X direction and the Y direction.

The waveguide 31 is a conductive tubular member contacting with an inner peripheral surface of a through hole penetrating through specific parts of the intermediate dielectric layers 43 in a direction from the second conductive layer 22 to the third conductive layer 23, an inside of the tubular member being filled with a dielectric material 44 made of a material different from the first dielectric layer 41, the second dielectric layer 42, and the intermediate dielectric layers 43. The materials of the first dielectric layer 41, the second dielectric layer 42, and the intermediate dielectric layer 43 are a glass fabric base epoxy resin, for example. The material of the dielectric material 44 filling the waveguide 31 is an epoxy resin, for example. Since different dielectric materials are used between the dielectric layers and the dielectric material 44 inside the waveguide 31, the dielectric material 44 that exhibits low loss can be provided inside the waveguide 31. Since the dielectric material 44 that exhibits low loss is provided inside the waveguide 31, the performance of the waveguide 31 can be improved.

As shown in FIG. 6, a first conductive pattern 21*a* is formed in the first conductive layer 21. A fourth conductive pattern 24*a* is formed in the fourth conductive layer 24. In FIG. 6, for the fourth conductive pattern 24*a*, only the outer shape is indicated by a broken line. In the present embodiment, the power feed line 1 is formed by the first conductive pattern 21*a*, the fourth conductive pattern 24*a*, and the waveguide 31. The shape of the first conductive pattern 21*a* in the present embodiment will be described. The first conductive pattern 21*a* includes a loop-shaped line portion 21*a*1 having a rectangular opening, and an input/output terminal portion 21*a*2 extending in the +Y direction from the loop-shaped line portion 21*a*1. The shape of the opening is not limited to a rectangular shape, and may be, for example, a polygonal shape other than a rectangular shape. The input/output terminal portion 21*a*2 has a multiple-stepped shape in which the width changes between the loop-shaped line portion 21*a*1 and an end of the first dielectric layer 41. The first conductive pattern 21*a* includes non-connection portions 21*a*3 located at positions on both sides in the X direction and adjacent to the loop-shaped line portion 21*a*1 so as to be located apart from the loop-shaped line portion 21*a*1. In the present embodiment, the shape of the non-connection portion 21*a*3 is a rectangular shape. However, the shape of the non-connection portion 21*a*3 is not limited to a rectangular shape, and may be, for example, a polygonal shape other than a rectangular shape.

The shape of the fourth conductive pattern 24*a* is the same as the shape of the first conductive pattern 21*a*. The fourth conductive pattern 24*a* includes a loop-shaped line portion 24*a*1, an input/output terminal portion 24*a*2, and non-connection portions 24*a*3. However, the extending direction of the input/output terminal portion 24*a*2 is different from the extending direction of the input/output terminal portion 21*a*2, and the extending direction of the input/output terminal portion 24*a*2 is the −X direction. The antenna 3 is connected to an end of the input/output terminal portion 21*a*2 or the input/output terminal portion 24*a*2.

The first conductive pattern 21*a* is electromagnetically coupled with a second slot 51. The opening of the loop-shaped line portion 21*a*1 is located so as to overlap the second slot 51 as seen in the Z direction, as shown in FIG. 1. The fourth conductive pattern 24*a* is electromagnetically coupled with a third slot 52. The opening of the loop-shaped line portion 24*a*1 is located so as to overlap the third slot 52 as seen in the Z direction. As long as the conductive patterns have shapes to be electromagnetically coupled with the respective slots, the shapes of the conductive patterns are not limited to the shapes shown in the present embodiment.

The second conductive layer 22 has the second slot 51 which is an opened part of the second conductive layer 22, as shown in FIG. 6. The third conductive layer 23 has the third slot 52 which is an opened part of the third conductive layer 23. The second slot 51 is electromagnetically coupled with the first conductive pattern 21*a* and the waveguide 31. The second slot 51 is located so as to overlap inner-side parts of the first conductive pattern 21*a* and the waveguide 31 as seen in the Z direction, as shown in FIG. 1. The third slot 52 is electromagnetically coupled with the fourth conductive pattern 24*a* and the waveguide 31. The third slot 52 is located so as to overlap inner-side parts of the fourth conductive pattern 24*a* and the waveguide 31 as seen in the Z direction.

In the present embodiment, the second slot 51 and the third slot 52 are formed in rectangular shapes. As long as the slots have shapes to be electromagnetically coupled with the respective conductive patterns and the waveguide 31, the shapes of the slots are not limited to the shapes shown in the present embodiment. Each slot may have a polygonal shape other than a square shape or a rectangular shape, or may be formed to have a floating conductive pattern in an inner area of the slot.

<Waveguide 31>

The configuration of the waveguide 31 which is a major part of the present disclosure will be described. The cross-section of the waveguide 31 along the direction perpendicular to the direction of penetration through the intermediate dielectric layers 43 has a shape obtained by cutting out both corners on one diagonal line of a quadrangular shape. The parts that are cut out are referred to as cutouts 61, 62. In FIG. 3, the shapes of the parts that are cut out in the cross-section of the waveguide 31 along the direction perpendicular to the direction of penetration through the intermediate dielectric layers 43 are quadrangular shapes. The shapes of the cutouts 61, 62 may be square shapes, or may be rectangular shapes as shown in FIG. 4. In a case where the quadrangular shape in the cross-section of the waveguide 31 is a square shape and the cutouts 61, 62 have square shapes, the cutouts 61, 62 are located symmetrically with respect to another diagonal line crossing the diagonal line on which the cutouts are present. In a case where the quadrangular shape in the cross-section of the waveguide 31 is a square shape and the cutouts 61, 62 have rectangular shapes, the cutouts 61, 62 are located asymmetrically with respect to another diagonal line crossing the diagonal line on which the cutouts are present.

In a case where the shapes of the cutouts are quadrangular shapes, since the shapes of the cutouts are simple, the shape of the waveguide 31 can be easily designed in accordance with the matching condition of the transmission line characteristic in propagation through the waveguide 31. The shapes of the cutouts are not limited to a quadrangular shape, and may be a polygonal shape other than a quadrangular shape, or cutout shapes asymmetric between left and right, in accordance with the matching condition of the transmission line characteristic. In a case where the shapes of the cutouts are other than quadrangular shapes, the number of parameters in designing increases, whereby it is possible to design the waveguide 31 having a more precise transmission characteristic.

Corners of the quadrangular shape in the cross-section of the waveguide 31 have right angles or rounded shapes. The corners of the quadrangular shape in the cross-section of the waveguide 31 shown in FIG. 3 in the present embodiment have right angles. In the case where the corners have right angles, a desired transmission characteristic can be easily obtained in the waveguide 31. The corners of the quadrangular shape in the cross-section of the waveguide 31 are not limited to right angles. As in another example of the waveguide 32 shown in FIG. 5, corners of the quadrangular shape in the cross-section of the waveguide 31 may have rounded shapes in accordance with the manufacturing condition of the waveguide 32 or the matching condition of the transmission line characteristic, for example. The other waveguide 32 has cutouts 63, 64. In the case where the corners have rounded shapes, ease of manufacturing of the waveguide 32 is improved, so that productivity of the multilayer substrate 11 can be improved.

Operation of the waveguide 31 having the cutouts 61, 62 will be described with reference to FIG. 7A to FIG. 7C. Arrows shown in FIG. 7A to FIG. 7C indicate directions of electric fields excited in the second slot 51, the waveguide 31, and the third slot 52. Here, it is assumed that a signal propagates in the −Y direction through the first conductive pattern 21*a*, and then passes through the waveguide 31 and propagates in the −X direction through the fourth conductive pattern 24*a*. In the drawings, a part where an electric field is excited is indicated by a solid line, a part where an electric field is excited after that is indicated by a broken line, and another part is indicated by a dotted line.

A signal propagating in the −Y direction through the first conductive pattern 21*a* is magnetically coupled with the second slot 51 and an electric field is excited in the −Y direction (the direction perpendicular to the X axis) in the second slot 51, as shown in FIG. 7A. The signal magnetically coupled with the second slot 51 propagates through the waveguide 31, as shown in FIG. 7B. The signal propagating through the waveguide 31 propagates in a state of being turned by 45 degrees with respect to the X axis in accordance with the shape of the waveguide 31. Then, the signal turned by 45 degrees with respect to the X-axis direction is magnetically coupled with the third slot 52, as shown in FIG. 7C. The signal magnetically coupled with the third slot 52 propagates in a state of being further turned by 45 degrees with respect to the X axis in accordance with the opening shape of the third slot 52. The electric field direction of the signal propagating through the third slot 52 comes into a state of being turned by 90 degrees with respect to the electric field direction of the signal having propagated through the second slot 51, and finally, is magnetically coupled with the fourth conductive pattern 24*a* and propagates in the −X direction.

As described above, the cross-section of the waveguide 31 along the direction perpendicular to the direction of penetration through the intermediate dielectric layers 43 has the shape obtained by cutting out both corners on one diagonal line of the quadrangular shape. Thus, the direction of propagation of a signal inside the multilayer substrate 11 can be changed by 90 degrees. Since the direction of propagation of a signal inside the multilayer substrate 11 can be changed by 90 degrees, an additional conductive pattern for changing the propagation direction of a signal is not needed in one of the first conductive layer 21 in which the first conductive pattern 21*a* is provided or the fourth conductive layer 24 in which the fourth conductive pattern 24*a* is provided. Since an additional conductive pattern is not needed, the size of the multilayer substrate 11 can be reduced. In addition, since an additional conductive pattern is not needed and the area of a circuit does not increase, the degree of freedom in designing of the multilayer substrate 11 can be improved. In addition, since there is no discontinuous part where the propagation direction of a signal is sharply changed, the amount of unnecessary radiation can be reduced. In addition, by using such a multilayer substrate 11 for the antenna device 100, it is possible to provide the antenna device 100 that is reduced in the amount of unnecessary radiation, reduced in size, and improved in the degree of freedom in designing.

Effects of the structure of the waveguide 31 as described above will be described using an example shown in FIG. 8. FIG. 8 shows a reflection coefficient with respect to a normalized frequency calculated through electromagnetic field analysis. The horizontal axis indicates the normalized frequency, and the vertical axis indicates the reflection coefficient. In the graph, the reflection coefficient is not greater than −20 dB in a bandwidth of 8% or more centered at a normalized frequency of "1", and thus it is found that a favorable characteristic is realized. This characteristic means that propagation is performed without reflection at a transmission frequency, and the propagation direction of a signal can be changed by 90 degrees with a favorable characteristic owing to the structure of the waveguide 31 according to the present disclosure. FIG. 8 shows an analysis result for the waveguide 31 having the cross-section along the perpendicular direction shown in FIG. 3, but the effects of the structure of the waveguide 31 are obtained in the same manner for other shapes of the waveguide 31 shown in embodiment 1 and for another embodiment described later.

<Dimensions of Waveguide 31>

The dimensions of the waveguide 31 will be described. The length in the penetration direction of the waveguide 31 in the intermediate dielectric layers 43 is ¼ of the wavelength of a signal propagating through the waveguide 31. In FIG. 1, the direction of a signal propagating through the waveguide 31 is the +Z direction or the −Z direction. The length in the penetration direction of the waveguide 31 in the intermediate dielectric layers 43 is not limited to ¼ of the wavelength of a signal propagating through the waveguide 31, and may be changed in accordance with a preferable transmission line characteristic or design specifications. In the case where the length in the penetration direction of the waveguide 31 in the intermediate dielectric layers 43 is ¼ of the wavelength of a signal propagating through the waveguide 31, a desired transmission characteristic can be easily obtained in the waveguide 31.

A specific example of dimensions of the waveguide 31 will be described. In a case where the frequency of a signal propagating through the waveguide 31 is 77 GHz and the relative permittivity of the dielectric material 44 is 3, the wavelength in the waveguide is calculated as 2.25 mm. In this case, a length that is ¼ of the wavelength in the waveguide is 0.56 mm. The waveguide 31 is provided in the multilayer substrate 11 so that the length in the penetration direction of the waveguide 31 in the intermediate dielectric layers 43 becomes 0.56 mm. When the length in the penetration direction of the waveguide 31 is 0.56 mm, the thickness of the multilayer substrate 11 is 1.1 mm, for example.

The distances between opposite sides of the quadrangular shape in the cross-section of the waveguide 31 are ½ of the wavelength of a signal propagating through the waveguide 31. In FIG. 3, the distances between opposite sides of the quadrangular shape in the cross-section of the waveguide 31 are indicated by arrows. The distances between opposite sides of the quadrangular shape in the cross-section of the waveguide 31 are not limited to ½ of the wavelength of a signal propagating through the waveguide 31, and may be changed in accordance with a preferable transmission line characteristic or design specifications. In the case where the distances between opposite sides of the quadrangular shape in the cross-section of the waveguide 31 are ½ of the wavelength of a signal propagating through the waveguide 31, a desired transmission characteristic can be easily obtained in the waveguide 31.

<Formation of Waveguide 31>

An example of a formation method for the waveguide 31 will be described for the waveguide 31 shown in FIG. 1. First, in a state in which five intermediate dielectric layers 43 and four intermediate conductive layers 25 are provided, a through hole is formed by a drill so as to penetrate through specific parts of the intermediate dielectric layers 43. Next, an inner peripheral surface of the through hole is plated, whereby a conductive tubular member is formed. The material for plating is copper, for example. The conductive tubular member and the intermediate conductive layers 25 are electrically connected. Next, an inside of the tubular member is filled with the dielectric material 44 made of a material different from the first dielectric layer 41, the second dielectric layer 42, and the intermediate dielectric layers 43. The material of the filling dielectric material 44 is epoxy resin, for example. In this way, the waveguide 31 part of the multilayer substrate 11 is formed. After the above process, the second conductive layer 22, the third conductive layer 23, the first dielectric layer 41, the second dielectric layer 42, the first conductive layer 21, and the fourth conductive layer 24 are provided in a laminated manner. Next, the first conductive pattern 21*a* is provided in the first conductive layer 21, and the fourth conductive pattern 24*a* is provided in the fourth conductive layer 24, whereby the multilayer substrate 11 is formed.

As described above, the multilayer substrate 11 according to embodiment 1 includes: the first dielectric layer 41 having the first conductive layer 21 on one side and the second conductive layer 22 on another side; the second dielectric layer 42 having the third conductive layer 23 on one side and the fourth conductive layer 24 on another side, the third conductive layer 23 being located apart from the second conductive layer 22; one or a plurality of intermediate dielectric layers 43 provided between the second conductive layer 22 and the third conductive layer 23; and the waveguide 31 which is the conductive tubular member contacting with the inner peripheral surface of the through hole penetrating through the specific parts of the intermediate dielectric layers 43, the inside of the tubular member being filled with the dielectric material 44 made of the material different from the first dielectric layer 41, the second dielectric layer 42, and the intermediate dielectric layer 43. The cross-section of the waveguide 31 along the direction perpendicular to the direction of penetration through the intermediate dielectric layers 43 has the shape obtained by cutting out both corners on one diagonal line of the quadrangular shape. Thus, the direction of propagation of a signal inside the multilayer substrate 11 can be changed by 90 degrees, and therefore an additional conductive pattern for changing the propagation direction of a signal is not needed in one of the first conductive layer 21 or the fourth conductive layer 24. Since an additional conductive pattern is not needed, the size of the multilayer substrate 11 can be reduced. In addition, since an additional conductive pattern is not needed and the area of a circuit does not increase, the degree of freedom in designing of the multilayer substrate 11 can be improved. In addition, since there is no discontinuous part where the propagation direction of a signal is sharply changed, the amount of unnecessary radiation in the multilayer substrate 11 can be reduced.

The length in the penetration direction of the waveguide 31 in the intermediate dielectric layers 43 may be ¼ of the wavelength of a signal propagating through the waveguide 31. Thus, a desired transmission characteristic can be easily obtained in the waveguide 31. The distances between opposite sides of the quadrangular shape in the cross-section of the waveguide 31 may be ½ of the wavelength of a signal propagating through the waveguide 31. Thus, a desired transmission characteristic can be easily obtained in the waveguide 31.

Corners of the quadrangular shape in the cross-section of the waveguide 31 may have right angles. Thus, a desired transmission characteristic can be easily obtained in the waveguide 31. Corners of the quadrangular shape in the cross-section of the waveguide 31 may have rounded shapes. Thus, a desired transmission characteristic can be easily obtained, and in addition, ease of manufacturing of the waveguide 31 is improved, so that productivity of the multilayer substrate 11 can be improved.

The shapes of the parts that are cut out in the cross-section of the waveguide 31 along the direction perpendicular to the direction of penetration through the intermediate dielectric layers 43 may be quadrangular shapes. Thus, since the shapes of the cutouts are simple, the shape of the waveguide 31 can be easily designed in accordance with the matching condition of the transmission line characteristic in propagation through the waveguide 31. The shapes of the cutouts 61, 62 may be other than quadrangular shapes. Thus, the number of parameters in designing increases, whereby it is possible to design the waveguide 31 having a more precise transmission characteristic.

The antenna device 100 according to embodiment 1 includes: the multilayer substrate 11 according to the present disclosure; and the antenna 3 connected to the first conductive layer 21 or the fourth conductive layer 24. Thus, by using the multilayer substrate 11 according to the present disclosure for the antenna device 100, it is possible to provide the antenna device 100 that is reduced in the amount of unnecessary radiation, reduced in size, and improved in the degree of freedom in designing.

Embodiment 2

Figure 9:
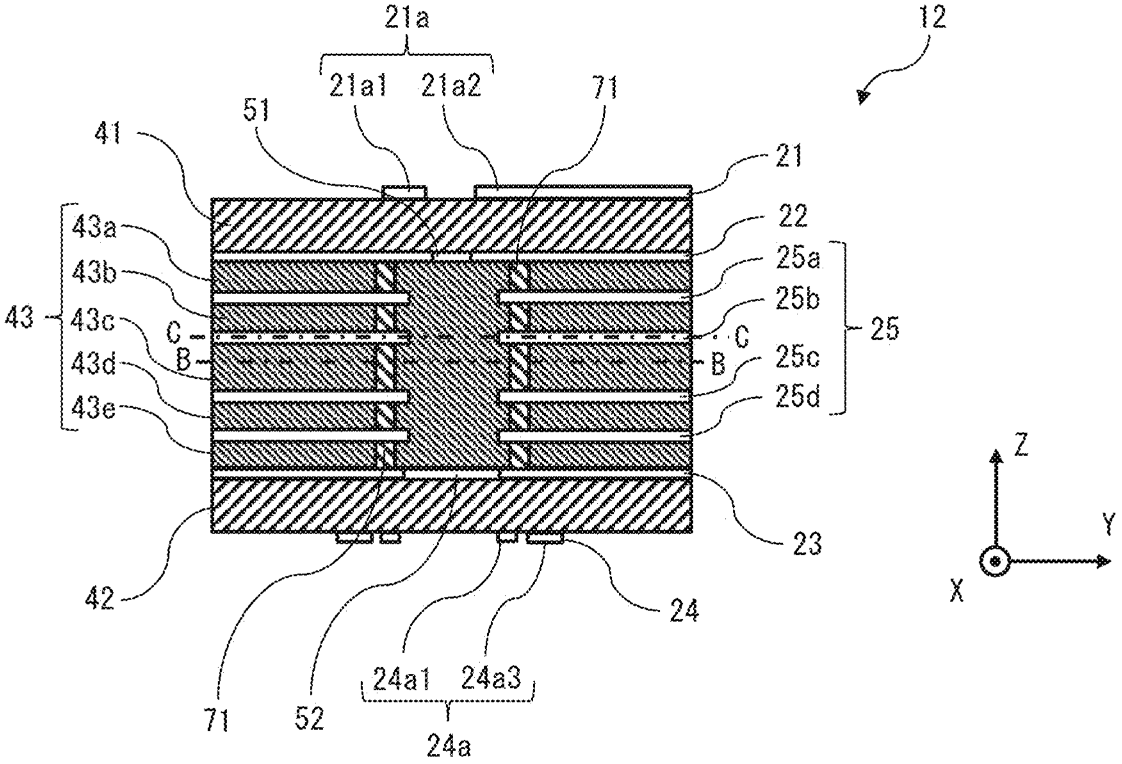
FIG. 9 is a sectional view schematically showing a multilayer substrate according to embodiment 2.
Figure 10:
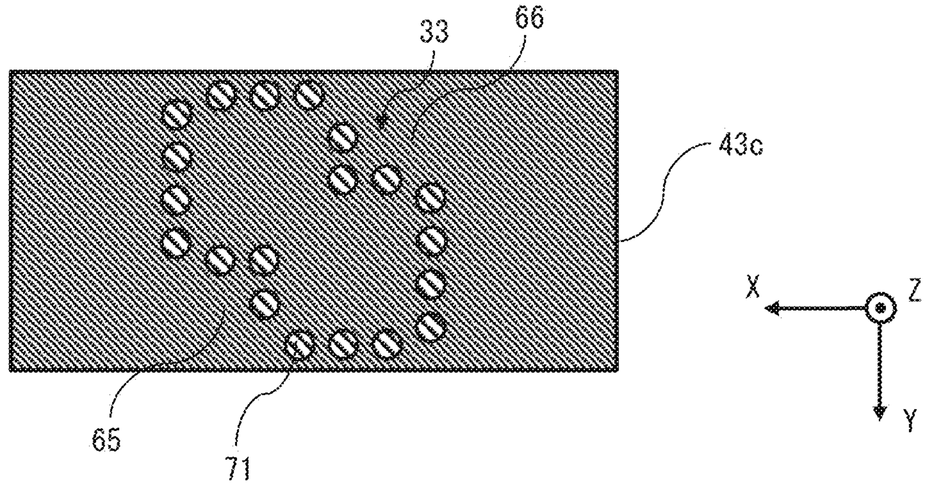
FIG. 10 is a sectional view of the multilayer substrate cut at a B-B cross-section position in FIG. 9.
Figure 11:
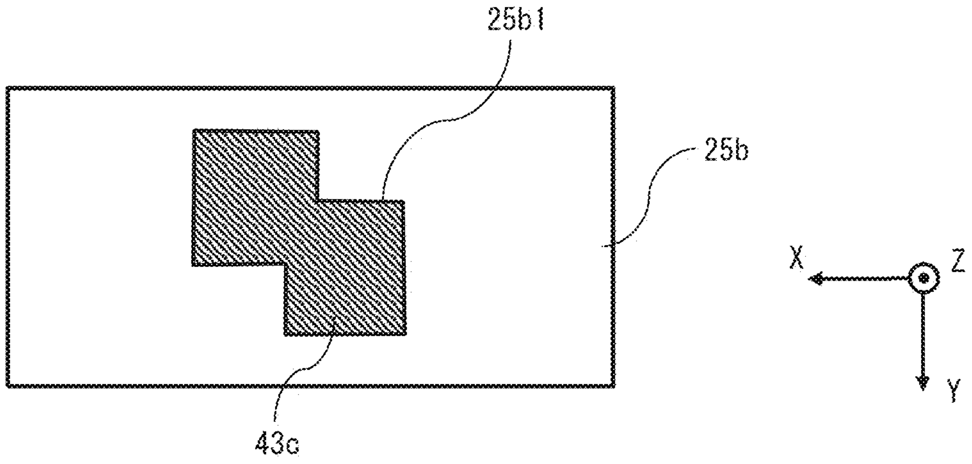
FIG. 11 is a sectional view of the multilayer substrate cut at a C-C cross-section position in FIG. 9.

A multilayer substrate 12 according to embodiment 2 will be described. FIG. 9 is a sectional view schematically showing the multilayer substrate 12 according to embodiment 2 when the multilayer substrate 12 is cut at a position equivalent to the A-A cross-section position in FIG. 6. FIG. 10 is a sectional view of the multilayer substrate 12 cut at a B-B cross-section position in FIG. 9 and is a sectional view of the intermediate dielectric layer 43*c* part. FIG. 11 is a sectional view of the multilayer substrate 12 cut at a C-C cross-section position in FIG. 9 and is a sectional view of the intermediate conductive layer 25*b* part. In the multilayer substrate 12 according to embodiment 2, a waveguide 33 is formed by a plurality of via holes 71.

As shown in FIG. 9, the multilayer substrate 12 includes the first dielectric layer 41 having the first conductive layer 21 on one side and the second conductive layer 22 on another side opposite to the one side, the second dielectric layer 42 having the third conductive layer 23 on one side and the fourth conductive layer 24 on another side opposite to the one side, the third conductive layer 23 being located apart from the second conductive layer 22, one or a plurality of intermediate dielectric layers 43 provided between the second conductive layer 22 and the third conductive layer 23, and the plurality of via holes 71 penetrating through the intermediate dielectric layer 43 in a direction from the second conductive layer 22 to the third conductive layer 23 and surrounding specific parts of the intermediate dielectric layers 43. The number of the intermediate dielectric layers 43 may be either one or plural. In the present embodiment, the multilayer substrate 12 includes five intermediate dielectric layers 43, i.e., the intermediate dielectric layers 43*a*, 43*b*, 43*c*, 43*d*, 43*e*. In the case where the multilayer substrate 12 includes a plurality of intermediate dielectric layers 43, the intermediate conductive layer 25 is provided at least at each part between the plurality of intermediate dielectric layers 43 excluding the specific parts and the waveguide 33 formed by the plurality of via holes 71. In the present embodiment, since the multilayer substrate 12 includes five intermediate dielectric layers 43, four intermediate conductive layers 25*a*, 25*b*, 25*c*, 25*d* are provided. Each of the conductive layers included in the multilayer substrate 12 is a copper foil, for example.

As shown in FIG. 10, the waveguide 33 is formed by the plurality of via holes 71. A line connecting the plurality of via holes 71 in the cross-section of the waveguide 33 along the direction perpendicular to the direction of penetration through the intermediate dielectric layers 43 has a shape obtained by cutting out both corners on one diagonal line of a quadrangular shape. The parts that are cut out are referred to as cutouts 65, 66. As shown in FIG. 11, the intermediate conductive layer 25*b* has an opening 25*b*1 surrounding the specific parts of the intermediate dielectric layers 43. The intermediate dielectric layer 43 part shown in FIG. 11 is the intermediate dielectric layer 43*c* part. The intermediate conductive layers 25*a*, 25*c*, 25*d* also have the same configurations as the intermediate conductive layer 25*b*. The plurality of via holes 71 are provided so as to overlap a peripheral part of the opening 25*b*1 surrounding the specific parts of the intermediate dielectric layers 43. The plurality of via holes 71 and the intermediate conductive layer 25 are electrically connected. In FIG. 10, the waveguide 33 is formed by twenty via holes 71, but the number of the via holes 71 is not limited thereto.

Regarding the waveguide 33 formed by the plurality of via holes 71, the line connecting the plurality of via holes 71 in the cross-section along the perpendicular direction has the shape obtained by cutting out both corners on one diagonal line of the quadrangular shape. Therefore, as in the waveguide 31 of embodiment 1, the direction of propagation of a signal inside the multilayer substrate 12 can be changed by 90 degrees. Since the direction of propagation of a signal inside the multilayer substrate 11 can be changed by 90 degrees, an additional conductive pattern for changing the propagation direction of a signal is not needed in one of the first conductive layer 21 in which the first conductive pattern 21*a* is provided or the fourth conductive layer 24 in which the fourth conductive pattern 24*a* is provided. Since an additional conductive pattern is not needed, the size of the multilayer substrate 12 can be reduced. In addition, since an additional conductive pattern is not needed and the area of a circuit does not increase, the degree of freedom in designing of the multilayer substrate 12 can be improved. In addition, since there is no discontinuous part where the propagation direction of a signal is sharply changed, the amount of unnecessary radiation can be reduced.

In the waveguide 31 shown in embodiment 1, the through hole penetrating through the specific parts of the intermediate dielectric layers 43 is formed by a drill. Therefore, the shape of the waveguide 31 depends on the size of the drill for forming the through hole, particularly at end parts such as corners of the waveguide 31. In the present embodiment, since the waveguide 33 is formed by the plurality of via holes 71, the shape of the waveguide 33 does not depend on the size of the drill, and therefore the degree of freedom in designing of the shape of the waveguide 33 can be improved.

As described above, the multilayer substrate 12 according to embodiment 2 includes the plurality of via holes 71 penetrating through the intermediate dielectric layers 43 in the direction from the second conductive layer 22 to the third conductive layer 23 and surrounding the specific parts of the intermediate dielectric layers 43. The waveguide 33 is formed by the plurality of via holes 71, and a line connecting the plurality of via holes 71 in the cross-section of the waveguide 33 along the direction perpendicular to the direction of penetration through the intermediate dielectric layers 43 has the shape obtained by cutting out both corners on one diagonal line of the quadrangular shape. Thus, the direction of propagation of a signal inside the multilayer substrate 12 can be changed by 90 degrees, and therefore an additional conductive pattern for changing the propagation direction of a signal is not needed in one of the first conductive layer 21 or the fourth conductive layer 24. In addition, since the waveguide 33 is formed by the plurality of via holes 71, the degree of freedom in designing of the shape of the waveguide 33 can be improved. In addition, since there is no discontinuous part where the propagation direction of a signal is sharply changed, the amount of unnecessary radiation can be reduced.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 power feed line
2 high-frequency signal generator
3 antenna
11, 12 multilayer substrate
21 first conductive layer
21*a* first conductive pattern
21*a*1 loop-shaped line portion
21*a*2 input/output terminal portion
21*a*3 non-connection portion
22 second conductive layer
23 third conductive layer
24 fourth conductive layer
24*a* fourth conductive pattern
24*a*1 loop-shaped line portion
24*a*2 input/output terminal portion
24*a*3 non-connection portion
25, 25*a*, 25*b*, 25*c*, 25*d* intermediate conductive layer
25*b*1 opening
31, 32, 33 waveguide
41 first dielectric layer
42 second dielectric layer
43, 43*a*, 43*b*, 43*c*, 43*d*, 43*e* intermediate dielectric layer
44 dielectric material
51 second slot
52 third slot
61, 62, 63, 64, 65, 66 cutout
71 via hole
100 antenna device

The invention claimed is:

1. A multilayer substrate comprising:

a first dielectric layer having a first conductive layer on one side and a second conductive layer on another side opposite to the one side;

a second dielectric layer having a third conductive layer on one side and a fourth conductive layer on another side opposite to the one side, the third conductive layer being located apart from the second conductive layer;

one or a plurality of intermediate dielectric layers provided between the second conductive layer and the third conductive layer; and a waveguide which is a conductive tubular member contacting with an inner peripheral surface of a through hole penetrating through specific parts of the one or a plurality of intermediate dielectric layers in a direction from the second conductive layer to the third conductive layer, an inside of the tubular member being filled with a dielectric material made of a material different from the first dielectric layer, the second dielectric layer, and the one or plurality of intermediate dielectric layers, wherein in a case where the plurality of the intermediate dielectric layers are provided, an intermediate conductive layer is provided at each part between the plurality of intermediate dielectric layers, and a cross-section of the waveguide along a direction perpendicular to a direction of penetration through the one or plurality of intermediate dielectric layers has a shape obtained by cutting out both corners on one diagonal line of a quadrangular shape.

2. The multilayer substrate according to claim 1, wherein a length in a penetration direction of the waveguide in the one or plurality of intermediate dielectric layers is ¼ of a wavelength of a signal propagating through the waveguide.

3. The multilayer substrate according to claim 1, wherein distances between opposite sides of the quadrangular shape are ½ of a wavelength of a signal propagating through the waveguide.

4. The multilayer substrate according to claim 1, wherein corners of the quadrangular shape have right angles or rounded shapes.

5. The multilayer substrate according to claim 1, wherein shapes of parts that are cut out in the cross-section of the waveguide along the direction perpendicular to the direction of penetration through the one or plurality of intermediate dielectric layers are quadrangular shapes.

6. An antenna device comprising:

the multilayer substrate according to claim 1; and an antenna connected to the first conductive layer or the fourth conductive layer.

7. A multilayer substrate comprising:

a first dielectric layer having a first conductive layer on one side and a second conductive layer on another side opposite to the one side;

a second dielectric layer having a third conductive layer on one side and a fourth conductive layer on another side opposite to the one side, the third conductive layer being located apart from the second conductive layer;

one or a plurality of intermediate dielectric layers provided between the second conductive layer and the third conductive layer; and a plurality of via holes penetrating through the one or plurality of intermediate dielectric layers in a direction from the second conductive layer to the third conductive layer and surrounding specific parts of the one or plurality of intermediate dielectric layers, wherein a waveguide is formed by the plurality of via holes, in a case where the plurality of intermediate dielectric layers are provided, an intermediate conductive layer is provided at least at each part between the plurality of intermediate dielectric layers excluding the specific parts and the waveguide, and a line connecting the plurality of via holes in a cross-section of the waveguide along a direction perpendicular to a direction of penetration through the one or plurality of intermediate dielectric layers has a shape obtained by cutting out both corners on one diagonal line of a quadrangular shape.

8. The multilayer substrate according to claim 7, wherein a length in a penetration direction of the waveguide in the one or plurality of intermediate dielectric layers is ¼ of a wavelength of a signal propagating through the waveguide.

9. The multilayer substrate according to claim 7, wherein distances between opposite sides of the quadrangular shape are ½ of a wavelength of a signal propagating through the waveguide.

10. The multilayer substrate according to claim 7, wherein corners of the quadrangular shape have right angles or rounded shapes.

11. The multilayer substrate according to claim 7, wherein shapes of parts that are cut out in the cross-section of the waveguide along the direction perpendicular to the direction of penetration through the one or plurality of intermediate dielectric layers are quadrangular shapes.

12. An antenna device comprising:

the multilayer substrate according to claim 7; and an antenna connected to the first conductive layer or the fourth conductive layer.

* * * * *